United States Patent
Shogenji et al.

(10) Patent No.: US 10,458,288 B2
(45) Date of Patent: Oct. 29, 2019

(54) METHOD AND APPARATUS FOR CONTROLLING A VARIABLE VALVE SYSTEM

(75) Inventors: Yoshiyuki Shogenji, Toyota (JP);
Fumito Takimoto, Nagoya (JP);
Takashi Nakagawa, Toyota (JP);
Shunsuke Habara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 1089 days.

(21) Appl. No.: 13/702,835

(22) PCT Filed: Jun. 9, 2011

(86) PCT No.: PCT/IB2011/001649
§ 371 (c)(1),
(2), (4) Date: Dec. 7, 2012

(87) PCT Pub. No.: WO2011/154838
PCT Pub. Date: Dec. 15, 2011

(65) Prior Publication Data
US 2013/0139770 A1    Jun. 6, 2013

(30) Foreign Application Priority Data
Jun. 10, 2010    (JP) .................................. 2010-132814

(51) Int. Cl.
*F01L 1/34*    (2006.01)
*F02D 41/00*    (2006.01)
(Continued)

(52) U.S. Cl.
CPC ............ *F01L 1/34* (2013.01); *F02D 41/0002* (2013.01); *F02D 41/221* (2013.01);
(Continued)

(58) Field of Classification Search
CPC ............... F02D 41/0002; F02D 41/221; F02D 41/2461; F02D 41/2464; F02D 2041/001;
(Continued)

(56) References Cited

U.S. PATENT DOCUMENTS 4,928,640 A * 5/1990 van Vuuren .............. F01L 1/34
123/90.17
5,623,896 A * 4/1997 Kato ................... F01L 1/34406
123/90.15
(Continued)

FOREIGN PATENT DOCUMENTS

JP    2003041977 A *  2/2003
JP    2004-183582 A    7/2004
(Continued)

OTHER PUBLICATIONS

Japanese Office Action for corresponding JP Patent Application No. 2010-132814 dated Apr. 26, 2012.
(Continued)

*Primary Examiner* — John M Zaleskas
(74) *Attorney, Agent, or Firm* — Sughrue Mion, PLLC

(57) ABSTRACT

A variable valve timing apparatus for an internal combustion engine, including: an actuator that activates a variable valve timing mechanism; a detection unit that detects a driving position of the actuator; a control unit that drive-controls the actuator, and when a predetermined execution condition is established, executes one of a first initialization process and a second initialization process that match the driving position of the actuator detected by the detection unit with an actual driving position of the actuator; and an abnormality determination unit that determines whether or not an abnormality is present in the driving position detected by the detection unit and stores an abnormality history after determining that an abnormality is present. The control unit executes the first initialization process when the abnormality (Continued)

history is stored and the second initialization process when the abnormality history is not stored.

8 Claims, 4 Drawing Sheets

(51) Int. Cl.
*F02D 41/24* (2006.01)
*F02D 41/22* (2006.01)
(52) U.S. Cl.
CPC .... *F02D 41/2461* (2013.01); *F02D 2041/001* (2013.01); *Y02T 10/42* (2013.01)
(58) Field of Classification Search
CPC ......... F01L 1/34; F01L 2800/00; Y02T 10/18; Y02T 10/42
USPC ...................................................... 123/90.15
See application file for complete search history.

(56) References Cited

U.S. PATENT DOCUMENTS

| | | | | |
|---|---|---|---|---|
| 5,664,528 | A * | 9/1997 | Kato .................... | F01L 1/34406 123/90.15 |
| 6,161,511 | A * | 12/2000 | Hashimoto ............... | F01L 1/34 123/90.15 |
| 6,170,446 | B1 * | 1/2001 | Hashimoto ............... | F01L 1/34 123/90.15 |
| 6,336,432 | B2 * | 1/2002 | Tachibana .................. | 123/90.15 |
| 2002/0056424 | A1 * | 5/2002 | Muraki ..................... | F01L 1/34 123/90.15 |
| 2002/0100442 | A1 * | 8/2002 | Takahashi ................. | F01L 1/34 123/90.17 |
| 2004/0112053 | A1 | 6/2004 | Yamada et al. | |
| 2005/0061271 | A1 * | 3/2005 | Pfeiffer ..................... | F01L 1/34 123/90.15 |
| 2005/0211207 | A1 * | 9/2005 | Urushihata ............. | F01L 1/024 123/90.17 |
| 2006/0174854 | A1 * | 8/2006 | Yoshizawa .......... | F01L 13/0021 123/348 |
| 2006/0213468 | A1 * | 9/2006 | Kawasaki ............. | F02D 13/023 123/90.15 |
| 2006/0260573 | A1 * | 11/2006 | Urushihata ............. | F01L 1/024 123/90.15 |
| 2007/0039579 | A1 * | 2/2007 | Fuwa .................... | F02D 13/023 123/90.16 |
| 2007/0157896 | A1 * | 7/2007 | Fuwa ...................... | F01L 1/185 123/90.16 |
| 2007/0227483 | A1 * | 10/2007 | Inoue ..................... | F01L 1/024 123/90.17 |
| 2009/0025665 | A1 * | 1/2009 | Inoue ........................ | F01L 1/34 123/90.15 |
| 2009/0055085 | A1 * | 2/2009 | Inoue .................. | F02D 13/0215 701/105 |
| 2009/0056652 | A1 * | 3/2009 | Katsuma ................. | F01L 1/344 123/90.15 |
| 2009/0071425 | A1 * | 3/2009 | Inoue ........................ | F01L 1/34 123/90.15 |
| 2009/0265077 | A1 * | 10/2009 | Urushihata ............... | F01L 1/34 701/103 |
| 2009/0267557 | A1 * | 10/2009 | Keefover ............. | G05B 13/024 318/565 |
| 2010/0071644 | A1 * | 3/2010 | Noda .................. | F01L 13/0015 123/90.16 |
| 2010/0106355 | A1 * | 4/2010 | Hattori ..................... | B60K 6/24 701/22 |
| 2010/0170459 | A1 * | 7/2010 | Fuwa ...................... | F01L 1/344 123/90.15 |
| 2010/0175662 | A1 * | 7/2010 | Fuwa .................. | F01L 13/0063 123/399 |
| 2010/0222990 | A1 * | 9/2010 | Mashiki .................. | F01L 1/352 701/105 |
| 2013/0192548 | A1 * | 8/2013 | Shogenji ............ | F02D 41/0002 123/90.15 |

FOREIGN PATENT DOCUMENTS

| | | | |
|---|---|---|---|
| JP | 2007187061 A | * | 7/2007 |
| JP | 2007-198236 A | | 8/2007 |
| JP | 2009-138557 A | | 6/2009 |
| JP | 2009-216052 A | | 9/2009 |
| JP | 2009216052 A | * | 9/2009 |

OTHER PUBLICATIONS

Human translation of JP 2009-216052 (Tamada) previously submitted on Dec. 7, 2012.

* cited by examiner

METHOD AND APPARATUS FOR CONTROLLING A VARIABLE VALVE SYSTEM

BACKGROUND OF THE INVENTION

1. Field of the Invention

The invention relates to a variable valve timing apparatus for an internal combustion engine and a control method thereof.

2. Description of Related Art

A conventional variable valve timing apparatus for an internal combustion engine includes a variable valve timing mechanism that varies valve characteristics of engine valves such as an intake valve and an exhaust valve, an actuator that is driven within a predetermined driving range in order to activate the variable valve timing mechanism, and an electronic control apparatus for drive-controlling the actuator.

To control the valve characteristics of the engine valves with a high degree of precision in this type of variable valve timing apparatus, it is important to accurately detect actual valve characteristics and activate the variable valve timing mechanism, or in other words to drive-control the actuator, such that the actual valve characteristics are matched with target characteristics. As regards a method of detecting the actual valve characteristics of the engine valves, considering that the valve characteristics of the engine valves correspond to a driving position of the actuator within the aforesaid driving range, a position sensor that detects the driving position of the actuator may be provided such that the actual valve characteristics of the engine valves are detected using the driving position of the actuator detected by the position sensor. Note that the driving position of the actuator detected by the position sensor (more accurately, information relating to the driving position) is stored in a random access memory (RAM) of the electronic control apparatus. Thus, the information relating to the driving position of the actuator stored in the RAM of the electronic control apparatus is read from the RAM when required, for example to detect the actual valve characteristics of the engine valves.

However, the information relating to the driving position of the actuator used to detect the actual valve characteristics of the engine valves does not always correspond to the actual driving position of the actuator and may deviate from the actual driving position. When noise is generated in a signal from the position sensor, for example, the actuator driving position detected by the sensor, or in other words the information relating to the driving position stored in the RAM of the electronic control apparatus, may take an inaccurate value. Further, the information relating to the driving position stored in the RAM of the electronic control apparatus may be reset to an initial value and thereby lost, or the content of the information may change, when a power supply to the electronic control apparatus is temporarily stopped (when a so-called instantaneous power cut occurs) or the like. In these cases, the actuator driving position detected by the position sensor, or in other words the information relating to the actuator driving position stored in the RAM of the electronic control apparatus, becomes inaccurate. As a result, the valve characteristics of the engine valves detected on the basis of the driving position information also become inaccurate. Hence, when the actuator is driven on the basis of the detected valve characteristics in an attempt to control the valve characteristics of the engine valves to the target characteristics, the control cannot be executed correctly.

In response to this problem, an initialization process is executed to match the actuator driving position detected by the position sensor with an actual actuator driving position when a predetermined execution condition is established. More specifically, the initialization process is performed through [Procedure 1] to [Procedure 3] described below.

[Procedure 1]

The actuator driving position detected by the position sensor, or in other words the information relating to the driving position stored in the RAM of the electronic control apparatus, is set at an initial value in a state where the actuator is driven to one end of the driving range.

[Procedure 2]

The actuator is driven to an opposite end of the driving range that is opposite to the one end of the driving range, and in this state, an offset amount from an appropriate value of the actuator driving position detected by the position sensor is obtained.

[Procedure 3]

The offset amount from the appropriate value of the detected actuator driving position is reflected in the driving position to compensate for the offset amount, and a reflected value is stored in the RAM of the electronic control apparatus as corrected information relating to the driving position.

Note that Japanese Patent Application Publication No. 2009-216052 (JP-A-2009-216052) describes driving the actuator from one end of the driving range to the opposite end of the driving range when executing the process for matching the actuator driving position detected by the position sensor with the actual driving position.

By executing the initialization process described above, the actuator driving position detected by the position sensor can be matched with the actual actuator driving position with a high degree of precision. The reason why the detected driving position can be matched with the actual driving position with a high degree of precision is that the information relating to the actuator driving position is set at the initial value at one end of the actuator driving range, whereupon the offset between the information relating to the actuator driving position and the actual driving position is corrected at the opposite end of the driving range that is opposite to the one end of the driving range. In other words, during the initialization process, as illustrated by [Procedure 1] to [Procedure 3], the actuator is driven (caused to perform a full stroke) from one end of the actuator driving range to the opposite end of the driving range that is opposite to the one end of the driving range.

However, when the actuator is driven by a full stroke in the initialization process described above, the valve characteristics of the engine valves invariably undergo great variation due to the accompanying operation of the variable valve timing mechanism, and this variation greatly affects an engine operation. Hence, the initialization process can only be executed during special engine operations when the aforementioned effect does not have to be taken into account, for example when the internal combustion engine is operated for the first time following recovery from an abnormality (an abnormality recovery operation) or the like, and it is therefore difficult to perform the initialization process during a normal engine operation. When the execution frequency of the initialization process decreases in this manner, the information relating to the actuator driving position stored in the RAM of the electronic control apparatus remains at an offset value from the actual driving position, and therefore, in many cases, the actuator is drive-controlled continuously using this inaccurate information. When the actuator is drive-controlled using the inaccurate information, the valve characteristics of the engine valves become inappropriate for the engine operation. As a result, a combustion condition of the internal combustion engine may deteriorate, leading to a reduction in an operability of the engine and an increase in exhaust emissions.

SUMMARY OF THE INVENTION

The invention provides a variable valve timing apparatus for an internal combustion engine and a control method thereof with which an execution frequency of an initialization process can be increased while ensuring that a detected driving position of an actuator can be matched with an actual driving position with a high degree of precision in the initialization process.

A first aspect of the invention relates to a variable valve timing apparatus for an internal combustion engine, including: an actuator that activates a variable valve timing mechanism that varies a valve characteristic of an engine valve; a detection unit that detects a driving position of the actuator; a control unit that drive-controls the actuator within a driving range thereof on the basis of the driving position detected by the detection unit, and when a predetermined execution condition is established, executes one of a first initialization process and a second initialization process that match the driving position of the actuator detected by the detection unit with an actual driving position of the actuator; and an abnormality determination unit that determines whether or not an abnormality is present in the driving position detected by the detection unit and stores an abnormality history after determining that an abnormality is present, wherein when the abnormality history is stored, the control unit executes the first initialization process in which the driving position detected by the detection unit in a state where the actuator is driven to one end of the driving range is set at an initial value, the actuator is then driven to an opposite end of the driving range that is opposite to the one end of the driving range, and an offset amount from an appropriate value of the driving position detected by the detection unit in a state where the actuator is driven to the opposite end of the driving range is reflected in the driving position to compensate for the offset amount, and when the abnormality history is not stored, the control unit executes the second initialization process in which a current driving position detected by the detection unit is set at an initial value of the driving position, the actuator is then driven to the opposite end of the driving range, and the offset amount from the appropriate value of the driving position detected by the detection unit in a state where the actuator is driven to the opposite end of the driving range is reflected in the driving position to compensate for the offset amount.

In the structure described above, the control unit may increase a driving speed of the actuator during the second initialization process beyond the driving speed during the first initialization process.

In the structure described above, the control unit may reduce the driving speed of the actuator when the actuator is driven towards the opposite end of the driving range and the driving position of the actuator detected by the detection unit is closer to the opposite end of the driving position than a predetermined position, in the second initialization process.

In the structure described above, the variable valve timing mechanism may include a valve lift variation mechanism that is activated by the actuator and varies a maximum lift amount and an operation angle of an intake valve; the one end of the driving range may be one of a Lo end where the maximum lift amount and the operation angle of the intake valve are smallest and a Hi end where the maximum lift amount and the operation angle of the intake valve are largest; and the opposite end of the driving range may be the other one of the Lo end and the Hi end.

In the structure described above, the abnormality determination unit may determine that the abnormality is present in the driving position detected by the detection unit on the basis of a instantaneous cut of a power supplied to the control unit.

A second aspect of the invention relates to a variable valve timing apparatus for an internal combustion engine, including: an actuator that activates a variable valve timing mechanism that varies a valve characteristic of an engine valve; a detection unit that detects a driving position of the actuator; a control unit that drive-controls the actuator within a driving range thereof on the basis of the driving position detected by the detection unit, and when a predetermined execution condition is established, executes an initialization process that matches the driving position of the actuator detected by the detection unit with an actual driving position of the actuator; and an abnormality determination unit that determines whether or not an abnormality is present in the driving position detected by the detection unit and stores an abnormality history after determining that an abnormality is present, wherein in the initialization process, the driving position detected by the detection unit in a state where the actuator is driven to one end of the driving range is set at an initial value, the actuator is then driven to an opposite end of the driving range that is opposite to the one end of the driving range, and an offset amount from an appropriate value of the driving position detected by the detection unit in a state where the actuator is driven to the opposite end of the driving range is reflected in the driving position to compensate for the offset amount; and when the abnormality history is not stored, the control unit increases a driving speed of the actuator during the initialization process beyond the driving speed when the abnormality history is stored.

In the structure described above, the control unit may reduce the driving speed of the actuator when the actuator is driven towards the opposite end of the driving range and the driving position of the actuator detected by the detection unit is closer to the opposite end of the driving position than a predetermined position, during the initialization process executed when the abnormality history is not stored.

In the structure described above, the variable valve timing mechanism may include a valve lift variation mechanism that is activated by the actuator and varies a maximum lift amount and an operation angle of an intake valve; the one end of the driving range may be one of a Lo end where the maximum lift amount and the operation angle of the intake valve are smallest and a Hi end where the maximum lift amount and the operation angle of the intake valve are largest; and the opposite end of the driving range may be the other one of the Lo end and the Hi end.

In the structure described above, the abnormality determination unit may determine that the abnormality is present in the driving position detected by the detection unit on the basis of a instantaneous cut of a power supplied to the control unit.

A third aspect of the invention relates to a control method for a variable valve timing apparatus for an internal combustion engine, including: detecting a driving position of an actuator that activates a variable valve timing mechanism that varies a valve characteristic of an engine valve; determining whether or not an abnormality is present in the detected driving position; storing an abnormality history after determining that an abnormality is present; and executing, upon establishment of a predetermined execution condition, one of a first initialization process and a second initialization process that match the detected driving position of the actuator with an actual driving position of the actuator, wherein in the first initialization process, the driving position detected in a state where the actuator is driven to one end of the driving range is set at an initial value, the actuator is then driven to an opposite end of the driving range that is opposite to the one end of the driving range, and an offset amount from an appropriate value of the driving position detected in a state where the actuator is driven to the opposite end of the driving range is reflected in the driving position to compensate for the offset amount; in the second initialization process, the driving position detected currently detected is set at an initial value, the actuator is then driven to the opposite end of the driving range, and the offset amount from the appropriate value of the driving position detected in a state where the actuator is driven to the opposite end of the driving range is reflected in the driving position to compensate for the offset amount; and the first initialization process is executed when the abnormality history is stored and the second initialization process is executed when the abnormality history is not stored.

A fourth aspect of the invention relates to a control method for a variable valve timing apparatus for an internal combustion engine, including: detecting a driving position of an actuator that activates a variable valve timing mechanism that varies a valve characteristic of an engine valve; determining whether or not an abnormality is present in the detected driving position; storing an abnormality history after determining that an abnormality is present; and executing, upon establishment of a predetermined execution condition, an initialization process that matches the detected driving position of the actuator with an actual driving position of the actuator, wherein in the initialization process, the driving position detected in a state where the actuator is driven to one end of the driving range is set at an initial value, the actuator is then driven to an opposite end of the driving range that is opposite to the one end of the driving range, and an offset amount from an appropriate value of the driving position detected in a state where the actuator is driven to the opposite end of the driving range is reflected in the driving position to compensate for the offset amount and when the abnormality history is not stored, a driving speed of the actuator during the initialization process is increased beyond the driving speed when the abnormality history is stored.

According to the structures described above, the execution frequency of the initialization process can be increased while ensuring that the detected driving position of the actuator is matched to the actual driving position with a high degree of precision in the initialization process.

BRIEF DESCRIPTION OF THE DRAWINGS

Features, advantages, and technical and industrial significance of exemplary embodiments of the invention will be described below with reference to the accompanying drawings; in which like numerals denote like elements, and wherein.

DETAILED DESCRIPTION OF EMBODIMENTS

First Embodiment

A first specific embodiment of a variable valve timing apparatus for varying valve characteristics of engine valves, such as an intake valve and an exhaust valve provided in an automobile engine, according to the invention will be described below with reference to FIGS. 1 to 6.

Figure 1:
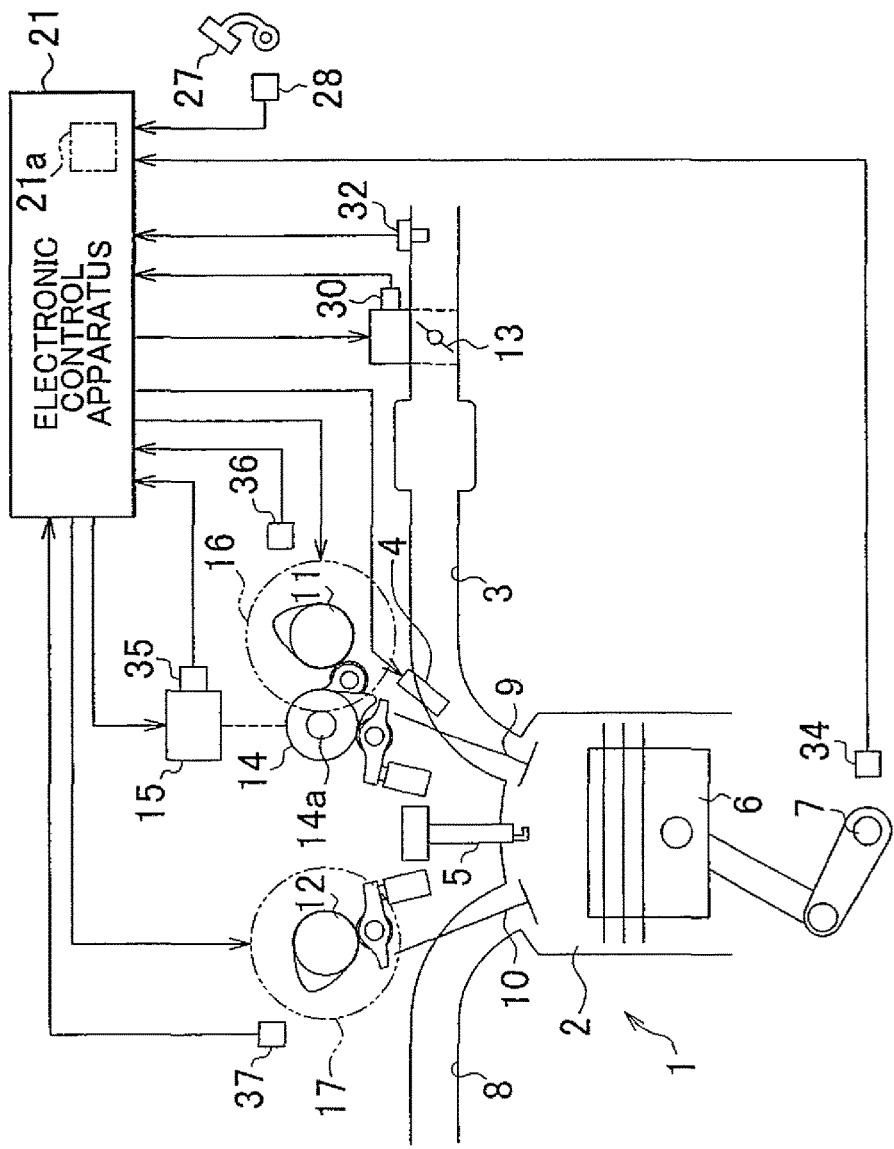
FIG. 1 is a schematic view showing the entirety of an engine to which a variable valve timing apparatus according to a first embodiment is applied.

In an engine 1 shown in FIG. 1, a throttle valve 13 is provided so as to be able to open and close in an intake passage 3 connected to a combustion chamber 2 of the engine 1. Air is taken into a cylinder through the intake passage 3, and fuel injected from a fuel injection valve 4 is supplied to the cylinder through the intake passage 3. When a spark plug 5 ignites an air-fuel mixture formed from the air and the fuel, the air-fuel mixture burns, causing a piston 6 to reciprocate, and as a result, a crankshaft 7 serving as an output shaft of the engine 1 rotates. After being burned in the cylinder, the air-fuel mixture is discharged from the cylinder to an exhaust passage 8 as exhaust gas.

In the engine 1, the combustion chamber 2 and the intake passage 3 are connected and disconnected in accordance with an opening/closing operation of an intake valve 9 serving as an engine valve of the engine 1. The combustion chamber 2 and the exhaust passage 8 are connected and disconnected in accordance with an opening/closing operation of an exhaust valve 10 serving as another engine valve of the engine 1 in addition to the intake valve 9. The intake valve 9 and the exhaust valve 10 are opened and closed by an intake cam shaft 11 and an exhaust cam shaft 12 which rotate when the rotation of the crankshaft 7 is transmitted thereto.

Figure 2:
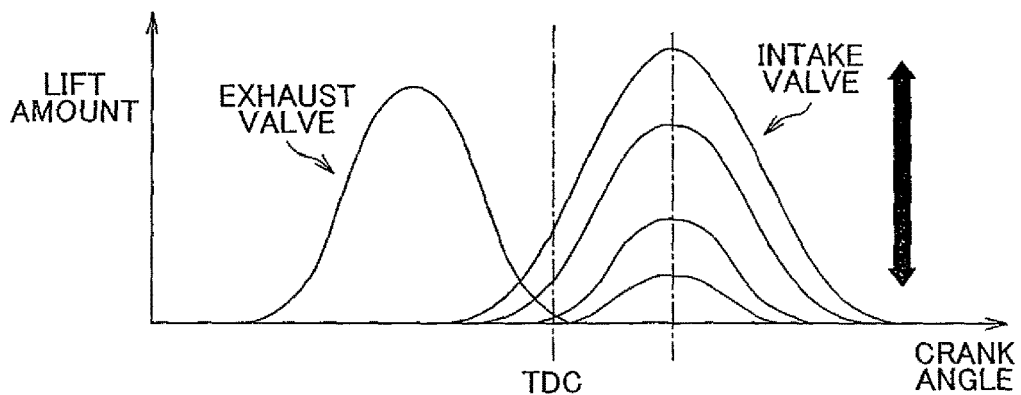
FIG. 2 is a timing chart showing the transition of lift amounts of an intake valve and an exhaust valve relative to variation in a crank angle.
Figure 3:
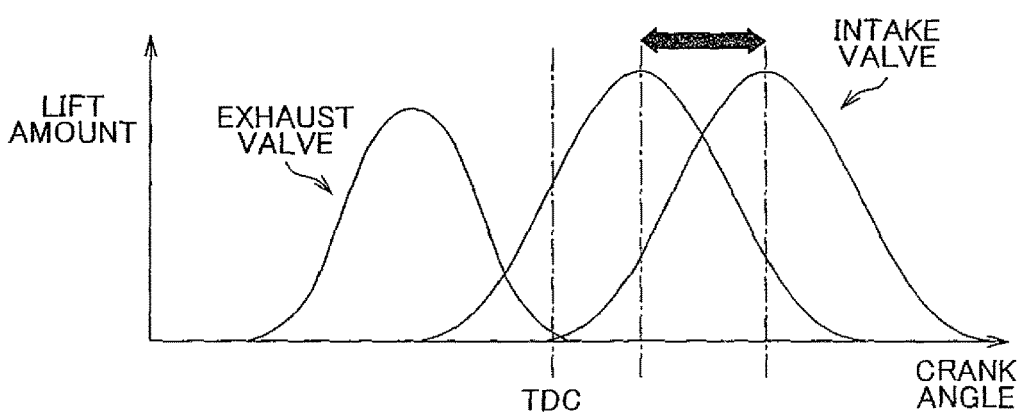
FIG. 3 is a timing chart showing the transition of the lift amounts of the intake valve and the exhaust valve relative to variation in the crank angle.

The engine 1 includes, as a variable valve timing mechanism for varying a valve characteristic (an opening/closing characteristic) of the intake valve 9, an intake valve timing variation mechanism 16 provided in the intake cam shaft 11 and a valve lift variation mechanism 14 provided between the intake cam shaft 11 and the intake valve 9. The valve lift variation mechanism 14 varies a maximum lift amount and an operation angle of the intake valve 9 in synchronization, as shown in FIG. 2, by displacing a control shaft 14a in an axial direction thereof. This axial direction displacement of the control shaft 14a is realized by an actuator 15. The actuator 15 includes an electric motor, and converts a rotary motion of the electric motor within a predetermined rotation angle range into a linear motion in the axial direction of the control shaft 14a. The intake valve timing variation mechanism 16 (FIG. 1) is driven by controlling an oil pressure that acts on the intake valve timing variation mechanism 16 via a hydraulic circuit. When driven, the intake valve timing variation mechanism 16 modifies a relative rotation phase (a valve timing of the intake valve 9) of the intake cam shaft 11 relative to the crankshaft 7. As shown in FIG. 3, by driving the intake valve timing variation mechanism 16 in this manner, an opening timing and a closing timing of the intake valve 9 are advanced or retarded while an opening period (operation angle) of the intake valve 9 is kept constant.

Figure 4:
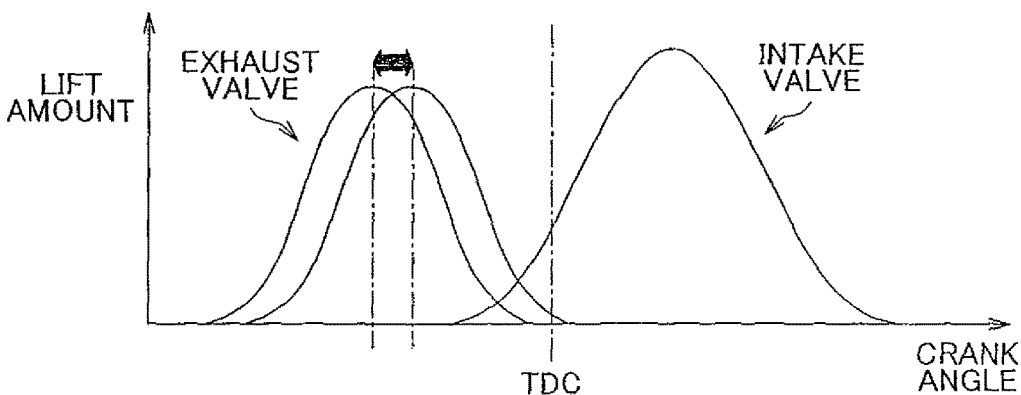
FIG. 4 is a timing chart showing the transition of the lift amounts of the intake valve and the exhaust valve relative to variation in the crank angle.

Further, the engine 1 shown in FIG. 1 includes, as a variable valve timing mechanism for varying a valve characteristic (an opening/closing characteristic) of the exhaust valve 10, an exhaust valve timing variation mechanism 17 that is provided in the exhaust cam shaft 12 to modify a relative rotation phase (a valve timing of the exhaust valve 10) of the exhaust cam shaft 12 relative to the crankshaft 7. The exhaust valve timing variation mechanism 17 is driven by controlling an oil pressure that acts on the exhaust valve timing variation mechanism 17 via a hydraulic circuit. As shown in FIG. 4, when the exhaust valve timing variation mechanism 17 is driven, an opening timing and a closing timing of the exhaust valve 10 are advanced or retarded while an opening period (operation angle) of the exhaust valve 10 is kept constant.

Next, an electric configuration of the variable valve timing apparatus provided in the engine 1 according to this embodiment will be described with reference to FIG. 1. The variable valve timing apparatus includes an electronic control apparatus 21 that executes various types of control relating to the engine 1. The electronic control apparatus 21 includes a central processing unit (CPU) that executes various calculation processes relating to the aforementioned control, a read-only memory (ROM) that stores programs and data required in the control, a RAM that stores calculation results generated by the CPU and so on temporarily, an input port into which signals are input from the outside, an output port that outputs signals to the outside, and so on.

Various sensors and the like, such as an accelerator position sensor 28, a throttle position sensor 30, an air flow meter 32, a crank position sensor 34, a position sensor 35, an intake cam position sensor 36, and an exhaust cam position sensor 37, are connected to the input port of the electronic control apparatus 21. The accelerator position sensor 28 detects an operation amount (an accelerator operation amount) of an accelerator pedal 27 that is depressed by a driver of the automobile.

The throttle position sensor 30 detects an opening (a throttle opening) of a throttle valve 13 provided in the intake passage 3. The air flow meter 32 detects an amount of air taken into the combustion chamber 2 (into the cylinder) through the intake passage 3.

The crank position sensor 34 outputs a signal corresponding to the rotation of the crankshaft 7, which is used to calculate an engine rotation speed, a crank angle, and so on. The position sensor 35 detects a rotation angle, which is a value within the predetermined rotation angle range of the electric motor of the actuator 15, as a driving position of the actuator 15.

The intake cam position sensor 36 outputs a signal corresponding to a rotation position of the intake cam shaft 11 on the basis of the rotation of the intake cam shaft 11. The exhaust cam position sensor 37 outputs a signal corresponding to a rotation position of the exhaust cam shaft 12 on the basis of the rotation of the exhaust cam shaft 12.

Drive circuits for the fuel injection valve 4, the throttle valve 13, the valve lift variation mechanism 14 (the actuator 15), the intake valve timing variation mechanism 16, the exhaust valve timing variation mechanism 17, and so on are connected to the output port of the electronic control apparatus 21.

The electronic control apparatus 21 learns engine operating conditions on the basis of detection signals input from the various sensors, and outputs command signals to the various drive circuits connected to the output port in accordance with the learned engine operating conditions. Thus, various types of operation control performed on the engine 1, such as valve characteristic variation control, throttle opening control, and fuel injection control, are implemented on the engine 1 via the electronic control apparatus 21.

To control the maximum lift amount and the operation angle of the intake valve 9, i.e. the valve characteristics of the intake valve 9, with a high degree of precision, it is important to accurately determine current values of the maximum lift amount and the operation angle and operate the valve lift variation mechanism 14, or in other words to drive-control the actuator 15, such that the determined maximum lift amount and operation angle are matched with target values. Here, the maximum lift amount and operation angle of the intake valve 9 are values corresponding to the driving position of the actuator 15 within the driving range thereof, or more specifically values corresponding to a rotation angle of the electric motor of the actuator 15 within a predetermined rotation angle range. Therefore, the current values of the maximum lift amount and the operation angle of the intake valve 9 can be determined on the basis of the rotation angle of the electric motor provided in the actuator 15, or in other words the driving position of the actuator 15, detected by the position sensor 35. Note that the driving position of the actuator 15 detected by the position sensor 35 (more accurately, information relating to the driving position) is stored in a RAM 21a (FIG. 1) of the electronic control apparatus 21. The driving position of the actuator 15 stored in the RAM 21a of the electronic control apparatus 21 is then read from the RAM 21a when required, for example to determine the current values of the maximum lift amount and the operation angle of the intake valve 9.

However, the information relating to the driving position of the actuator 15 detected by the position sensor 35 and stored in the RAM 21a does not always correspond to an actual driving position of the actuator 15 and may deviate from the actual driving position of the actuator 15. When noise is generated in the signal from the position sensor 35, for example, the driving position of the actuator 15 detected by the sensor 35 may take an inaccurate value, and as a result, the information relating to the driving position stored in the RAM 21a of the electronic control apparatus 21 may deviate from the actual driving position. Further, the information relating to the driving position stored in the RAM 21a may deviate from the actual driving position when the information relating to the driving position stored in the RAM 21a is lost and reset to an initial value or the content of the information changes due to a temporary stoppage of a power supply to the electronic control apparatus 21 (a so-called instantaneous power cut) or the like. When the information relating to the driving position stored in the RAM 21a becomes inaccurate in this manner, the current values of the maximum lift amount and operation angle of the intake valve 9 determined on the basis of the driving position information also become inaccurate. In this case, when the actuator 15 is driven on the basis of the determined current values of the maximum lift amount and operation angle of the intake valve 9 in an attempt to control the maximum lift amount and operation angle of the intake valve 9 to target values, it may be impossible to execute the control correctly.

In response to this problem, an initialization process is executed to match the driving position of the actuator 15 detected by the position sensor 35 with the actual driving position of the actuator 15. The initialization process is performed through [Procedure 1] to [Procedure 3] described below.

[Procedure 1]

The driving position of the actuator 15 detected by the position sensor 35, or in other words the information relating to the driving position stored in the RAM 21*a* of the electronic control apparatus 21, is set at an initial value in a state where the actuator 15 is driven to one end of the driving range thereof.

[Procedure 2]

The actuator 15 is driven to an opposite end of the driving range that is opposite to the one end of the driving range, and in this state, an offset amount from an appropriate value of the driving position of the actuator 15 detected by the position sensor 35 is obtained.

[Procedure 3]

The offset amount from the appropriate value of the detected driving position of the actuator 15 is reflected in the driving position to compensate for the offset amount, and a reflected value is stored in the RAM 21*a* of the electronic control apparatus 21 as the information relating to the driving position.

By executing this initialization process, the driving position of the actuator 15 detected by the position sensor 35 can be matched with the actual driving position of the actuator 15 with a high degree of precision. The reason for this is that in the initialization process, the information relating to the driving position of the actuator 15 is set at the initial value at one end of the driving range of the actuator 15, whereupon the offset between the information and the actual driving position is corrected at the opposite end of the driving range that is opposite to the one end of the driving range. In other words, during the initialization process, as illustrated by [Procedure 1] to [Procedure 3], the actuator 15 is driven (caused to perform a full stroke) from one end of the driving range to the opposite end of the driving range that is opposite to the one end of the driving range.

However, when the actuator 15 is driven by a full stroke during the initialization process, the maximum lift amount and operation angle of the intake valve 9 invariably undergo great variation due to the accompanying operation of the valve lift variation mechanism 14, and this variation greatly affects the engine operation. Hence, the initialization process can only be executed during special engine operations when the aforementioned effect does not have to be taken into account, for example when the engine 1 is operated for the first time following recovery from an abnormality (an abnormality recovery operation) or the like, and it is therefore difficult to perform the initialization process during a normal engine operation. The execution frequency of the initialization process decreases accordingly, the information relating to the driving position of the actuator 15 stored in the RAM 21*a* of the electronic control apparatus 21 remains at an offset value from the actual driving position, and therefore, in many cases, the actuator 15 is drive-controlled continuously using this inaccurate information. When the actuator 15 is drive-controlled using the inaccurate information, the maximum lift amount and operation angle of the intake valve 9 become inappropriate for the engine operation. As a result, a combustion condition of the engine 1 may deteriorate, leading to a reduction in an operability of the engine 1 and an increase in exhaust emissions.

Next, an outline of an initialization process according to this embodiment, with which the problem described above can be solved, will be described. The electronic control apparatus 21 determines whether or not an abnormality exists in the information relating to the driving position of the actuator 15 detected by the position sensor 35, and having determined that abnormality exists, the electronic control apparatus 21 stores an abnormality history in the RAM 21*a*. An example of a situation in which the abnormality history is stored in the RAM 21*a* is when the power supply to the electronic control apparatus 21 is cut off instantaneously. In other words, the electronic control apparatus 21 determines that an abnormality exists in the information relating to the driving position of the actuator 15 detected by the position sensor 35 on the basis of the instantaneous power cut; for example, and stores the abnormality history in the RAM 21*a*.

In a situation where the abnormality history is stored, it is highly likely that the driving position of the actuator 15 detected by the position sensor 35, or in other words the information relating to the driving position stored in the RAM 21*a*, has deviated greatly from the actual driving position. Further, the information relating to the driving position stored in the RAM 21*a* may deviate from the actual driving position even when the abnormality history is not stored. For example, when the driving position of the actuator 15 detected by the position sensor 35 deviates from the actual driving position due to noise in the signal from the position sensor 35 or the like, the information relating to the driving position of the actuator 15 stored in the RAM 21*a* also deviates from the actual driving position. Note, however, that a deviation occurring when the abnormality history is not stored is smaller than a deviation occurring when the abnormality history is stored due to an instantaneous power cut or the like.

In consideration of the above, the initialization process using full stroke driving (to be referred to below as a first initialization process) according to this embodiment is executed only when the abnormality history is stored in the RAM 21*a*. As a result, the driving position of the actuator 15 detected by the position sensor 35, or in other words the information relating to the driving position stored in the RAM 21*a*, can be matched with the actual driving position with a high degree of precision even when the information relating to the driving position deviates greatly from the actual driving position. When the abnormality history is not stored in the RAM 21*a*, on the other hand, it is unlikely that the information relating to the driving position stored in the RAM 21*a* deviates greatly from the actual driving position, and therefore an initialization process using short stroke driving, to be described below, is executed with the aim of increasing the execution frequency of the initialization process. The initialization process using short stroke driving will be referred to below as a second initialization process.

The second initialization process differs from the first initialization process only in [Procedure 1], of [Procedure 1] to [Procedure 3]. More specifically, a following [Procedure 1a] is executed in place of [Procedure 1].

[Procedure 1a]

A current driving position of the actuator 15 detected by the position sensor 35, or in other words information relating to the current driving position stored in the RAM 21*a* of the electronic control apparatus 21, is set without modification as the initial value of the driving position.

[Procedure 2] and [Procedure 3] are then executed as described above to match the information relating to the driving position of the actuator 15 stored in the RAM 21*a* of the electronic control apparatus 21 with the actual driving position.

In the second initialization process, the drive of the actuator 15 in [Procedure 1a] and [Procedure 2] is a short drive (short stroke driving) from the position at the start of the initialization process to the opposite end of the driving range. When the actuator 15 is driven by the short stroke, large variation in the maximum lift amount and operation angle of the intake valve 9 caused by the accompanying operation of the valve lift variation mechanism 14 is suppressed, and therefore the variation in the maximum lift amount and operation angle does not greatly affect the engine operation. Hence, the second initialization process can be executed not only during special engine operations where the aforementioned effect does not have to be taken into account, for example when the engine 1 is operated for the first time following recovery from an abnormality (an abnormality recovery operation) or the like, but also during a normal engine operation. As a result, the execution frequency of the initialization process can be increased.

As described above, in the second initialization process, the current driving position of the actuator 15 detected by the position sensor 35 is set without modification as the initial value of the driving position in [Procedure 1a]. Therefore, an offset may occur in the set initial value relative to the actual driving position of the actuator 15. However, in a situation where the abnormality history is not stored, the offset is not likely to be large. Hence, even when such an offset exists, the actuator 15 is driven to the opposite end of the driving range that is opposite to the one end of the driving range; and in this state, the offset in the detected driving position from the actual driving position of the actuator 15 is corrected during [Procedure 2] and [Procedure 3] of the second initialization process. As a result, the detected driving position can be matched with the actual driving position.

By executing the first initialization process when the abnormality history is stored and executing the second initialization process when the abnormality history is not stored, as described above, the execution frequency of the initialization process can be increased while ensuring that the driving position of the actuator 15 detected by the position sensor 35 can be matched with the actual driving position with a high degree of precision. Hence, situations in which the information relating to the driving position of the actuator 15 stored in the RAM 21*a* of the electronic control apparatus 21 remains at an offset value from the actual driving position and therefore the actuator 15 is continuously drive-controlled using this inaccurate information can be suppressed. Accordingly, situations in which the actuator 15 is drive-controlled in a manner such that the maximum lift amount and operation angle of the intake valve 9 become inappropriate for the engine operation are suppressed, and as a result, deterioration of the combustion condition of the engine 1, leading to a reduction in the operability of the engine 1 and an increase in exhaust emissions, is prevented.

Figure 5:
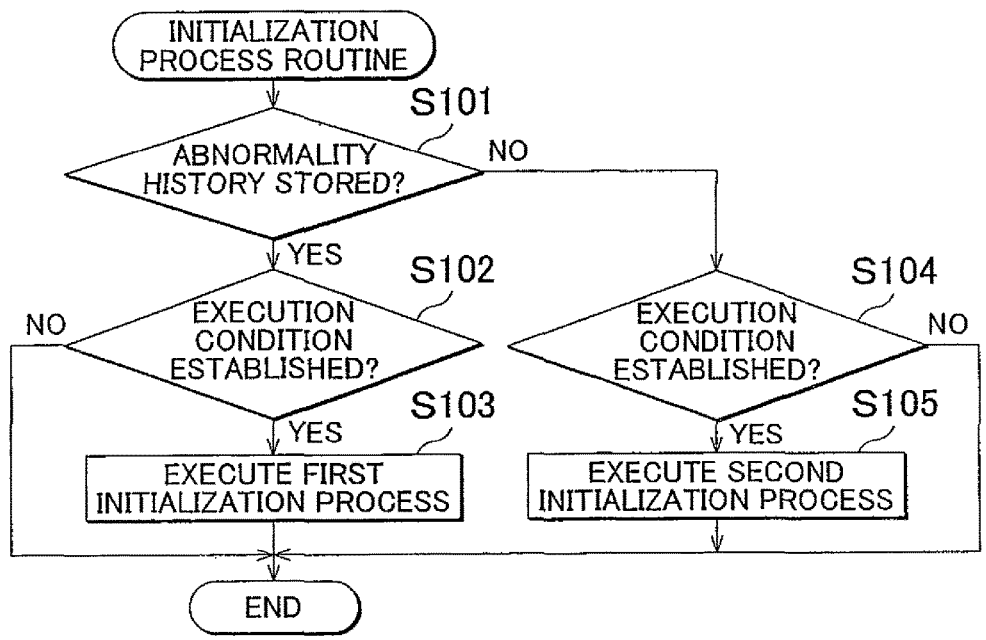
FIG. 5 is a flowchart showing procedures for executing an initialization process according to the first embodiment.

Next, the procedures executed during the initialization process according to this embodiment will be described in detail with reference to a flowchart in FIG. 5, which illustrates an initialization process routine. This initialization process routine is executed periodically via the electronic control apparatus 21 through time interruptions at predetermined time intervals, for example.

In the initialization process routine, first, a determination is made as to whether or not the abnormality history is stored in the RAM 21*a* (S101). When an affirmative determination is made in S101, a determination is made as to whether or not an execution condition of the first initialization process is established (S102). Establishment of the execution condition of the first initialization process is determined by determining whether or not the engine 1 is being operated for the first time following recovery from an abnormality (whether or not an abnormality recovery operation is underway), for example. When it is determined that the execution condition of the first initialization process is established, the first initialization process is executed (S103).

In [Procedure 2] of the first initialization process, the actuator 15 is driven from the one end of the driving range to the opposite end of the driving range that is opposite to the one end. For example, the actuator 15 is driven from an end (a Lo end) at which the maximum lift amount and operation angle of the intake valve 9 are at a minimum to an end (a Hi end) at which the maximum lift amount and operation angle of the intake valve 9 are at a maximum. Hence, in [Procedure 1], the driving position of the actuator 15 detected by the position sensor 35, or in other words the information relating to the driving position stored in the RAM 21*a* of the electronic control apparatus 21, is set as the initial value in a state where the actuator 15 has been driven to the Lo end. Further, in [Procedure 2], the actuator 15 is driven to the Hi end, and in this state, the offset amount from the appropriate value of the driving position of the actuator 15 detected by the position sensor 35 is obtained. Then, in [Procedure 3] of the first initialization process, the offset amount from the appropriate value of the detected driving position of the actuator 15 is reflected in the driving position to compensate for the offset amount. For example, the detected driving position of the actuator 15 is corrected on the basis of the offset amount. The reflected (corrected) value is then stored in the RAM 21*a* of the electronic control apparatus 21 as the information relating to the driving position.

When it is determined in the process of S101 that the abnormality history is not stored in the RAM 21*a*, on the other hand, a determination is made as to whether or not an execution condition of the second initialization process is established (S104). Establishment of the execution condition of the second initialization process is determined by determining whether or not an amount of increase in acceleration required of the engine 1 (hereinafter also simply referred to as "amount of increase in the required acceleration") equals or exceeds a predetermined determination value Ta, for example. Note that in this embodiment, the amount of increase in the throttle opening is used as the amount of increase in the required acceleration. Further, the determination value Ta may be set at a minimum value of the amount of increase in the required acceleration at which variation in the engine operation accompanying driving of the actuator 15 in [Procedure 1a] and [Procedure 2] of the second initialization process can be considered to be smaller than variation in the engine operation caused by the increase in the required acceleration. In this case, the determination value Ta is set in advance on the basis of an experiment or the like.

When it is determined in the process of S104 that the execution condition of the second initialization process is established, the second initialization process is executed (S105). Note that as long as the amount of increase in the required acceleration is no smaller than the predetermined determination value Ta in the process of S104, the execution condition of the second initialization process is determined to be established regardless of whether or not a special engine operation such as the aforesaid abnormality recovery operation is underway, i.e. during a normal engine operation as well as the abnormality recovery operation. Hence, the second initialization process is executed not only during a special engine operation such as the abnormality recovery operation, but also during a normal engine operation.

In [Procedure 2] of the second initialization process, the actuator 15 is driven from its current driving position to the opposite end of the driving range (the Hi end in this example). In [Procedure 1a], the driving position of the actuator 15 detected by the position sensor 35, or in other words the information relating to the driving position stored in the RAM 21a of the electronic control apparatus 21, is set without modification as the initial value of the driving position. Further, in [Procedure 2], the actuator 15 is driven to the Hi end, and in this state, the offset amount from the appropriate value of the driving position of the actuator 15 detected by the position sensor 35 is obtained. Then, in [Procedure 3] of the second initialization process, the offset amount from the appropriate value of the detected driving position of the actuator 15 is reflected in the driving position to compensate for the offset amount. For example, the detected driving position of the actuator 15 is corrected on the basis of the offset amount. The reflected (corrected) value is then stored in the RAM 21a of the electronic control apparatus 21 as the information relating to the driving position.

Figure 6:
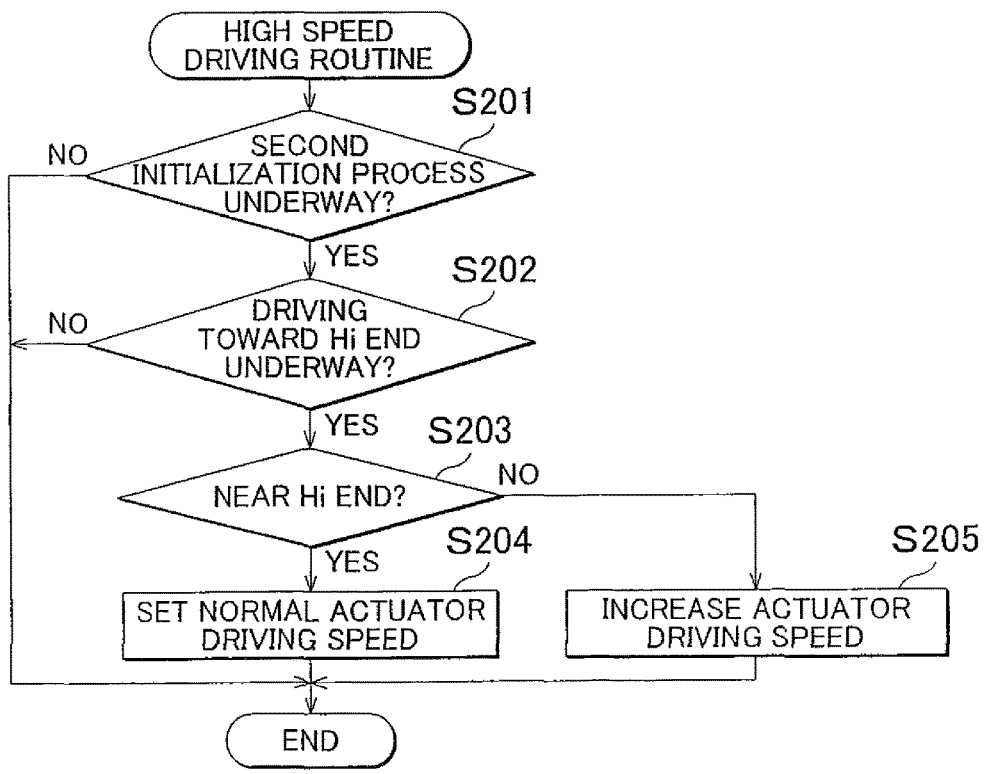
FIG. 6 is a flowchart showing procedures for controlling a driving speed of an actuator during a second initialization process.

Next, control of a driving speed of the actuator 15 during the second initialization process will be described with reference to a flowchart in FIG. 6, which illustrates a high speed driving routine. This high speed driving routine is executed periodically via the electronic control apparatus 21 through time interruptions at predetermined time intervals, for example.

In this routine, first, a determination is made as to whether or not the second initialization process is underway (S201). When an affirmative determination is made in S201, a determination is made as to whether or not the actuator 15 is currently being driven to the Hi end (S202). When an affirmative determination is made in S202, a determination is made as to whether or not the current driving position of the actuator 15 is near the Hi end (S203). When the actuator 15 is being driven to the Hi end but the current driving position of the actuator 15 is not near the Hi end (S203: NO), the driving speed of the actuator 15 is increased beyond a normal driving speed (the driving speed of the actuator 15 during the first initialization process) (S205). When the actuator 15 is being driven to the Hi end and the current driving position of the actuator 15 is near the Hi end (S203: YES), the driving speed of the actuator 15 is set at the normal driving speed (S204).

Hence, in the second initialization process performed when the abnormality history is not stored, the driving speed of the actuator 15 is increased beyond the normal driving speed only when the actuator 15 is being driven toward the Hi end in accordance with [Procedure 2] but the current position of the actuator 15 is not near the Hi end. In so doing, even when variation in the maximum lift amount and operation angle of the intake valve 9 accompanying driving of the actuator 15 to the Hi end affects the engine operation, a period during which this effect appears can be shortened. As a result, the effect of variation in the maximum lift amount and operation angle on the engine operation can be reduced even further.

Furthermore, when the actuator 15 is being driven toward the Hi end and the current driving position of the actuator 15 is near the Hi end, the driving speed of the actuator 15 is reduced to the normal value. In so doing, a situation in which the actuator 15 is stopped suddenly after being driven to the Hi end with excessive momentum can be prevented from occurring in a case where the driving speed of the actuator 15 is increased when the current position of the actuator 15 is not near the Hi end, as described above. Incidentally, the current driving position of the actuator 15 is determined to be near the Hi end in the process of S203 when the current driving position approaches a position removed from the Hi end by a predetermined distance X. Alternatively, the current driving position of the actuator 15 may be determined to be near the Hi end when the current driving position is closer to the Hi end than a predetermined position. The distance X and the predetermined position are set at values required to reduce the driving speed of the actuator 15 to a normal value before the actuator 15 reaches the Hi end, for example.

According to the embodiment described in detail above, the following effects are obtained. (1) Either one of the two initialization processes for matching the driving position of the actuator 15 detected by the position sensor 35 with the actual driving position is executed in accordance with whether or not the abnormality history is stored in the RAM 21a of the electronic control apparatus 21. More specifically, the initialization process using full stroke driving (the first initialization process) is performed when the abnormality history is stored, while the initialization process using short stroke driving (the second initialization process) is performed when the abnormality history is not stored. Thus, the execution frequency of the initialization process can be increased while ensuring that the driving position of the actuator 15 detected by the position sensor 35 can be matched with the actual driving position with a high degree of precision. Hence, situations in which the information relating to the driving position of the actuator 15 stored in the RAM 21a of the electronic control apparatus 21 remains at an offset value from the actual driving position due to a reduction in the execution frequency of the initialization process and therefore the actuator 15 is drive-controlled continuously using this inaccurate information can be suppressed. Accordingly, situations in which the actuator 15 is drive-controlled in a manner such that the maximum lift amount and operation angle of the intake valve 9 become inappropriate for the engine operation are suppressed, and as a result, deterioration of the combustion condition of the engine 1, leading to a reduction in the operability of the engine 1 and an increase in exhaust emissions, is prevented.

(2) In the second initialization process performed when the abnormality history is not stored, the driving speed of the actuator 15 is increased beyond the normal driving speed only when the actuator 15 is being driven toward the Hi end but the current position of the actuator 15 is not near the Hi end. Hence, even when variation in the maximum lift amount and operation angle of the intake valve 9 accompanying driving of the actuator 15 to the Hi end affects the engine operation, the period during which this effect appears can be shortened. As a result, the effect of the variation in the maximum lift amount and operation angle on the engine operation can be reduced even further. Note that when the initialization process is executed in a state where the driving speed of the actuator 15 has been increased, the actuator 15 is driven more quickly than usual, and therefore an error is more likely to occur in the current driving position of the actuator 15 detected by the position sensor 35 during driving of the actuator 15. However, in a situation where the abnormality history is not stored, this error does not take a large value. Therefore, by correcting the offset of the driving position detected when the actuator 15 reaches the Hi end relative to the actual driving position during the initialization process, the detected driving position can be matched with the actual driving position even when an error occurs.

(3) When the actuator 15 is being driven toward the Hi end and the current driving position of the actuator 15 is near the Hi end in the second initialization process described above, the driving speed of the actuator 15 is reduced to the normal value. In so doing, a situation in which the actuator 15 is stopped suddenly after being driven to the Hi end with excessive momentum can be prevented from occurring in a case where the driving speed of the actuator 15 is increased when the current position of the actuator 15 is not near the Hi end, as described above.

Second Embodiment

Next, a second embodiment of the invention will be described on the basis of FIGS. 7 and 8. In this embodiment, the initialization process using full stroke driving is performed at all times, regardless of the presence or absence of the abnormality history, and the driving speed of the actuator 15 during the initialization process is varied in accordance with the presence or absence of the abnormality history.

Figure 7:
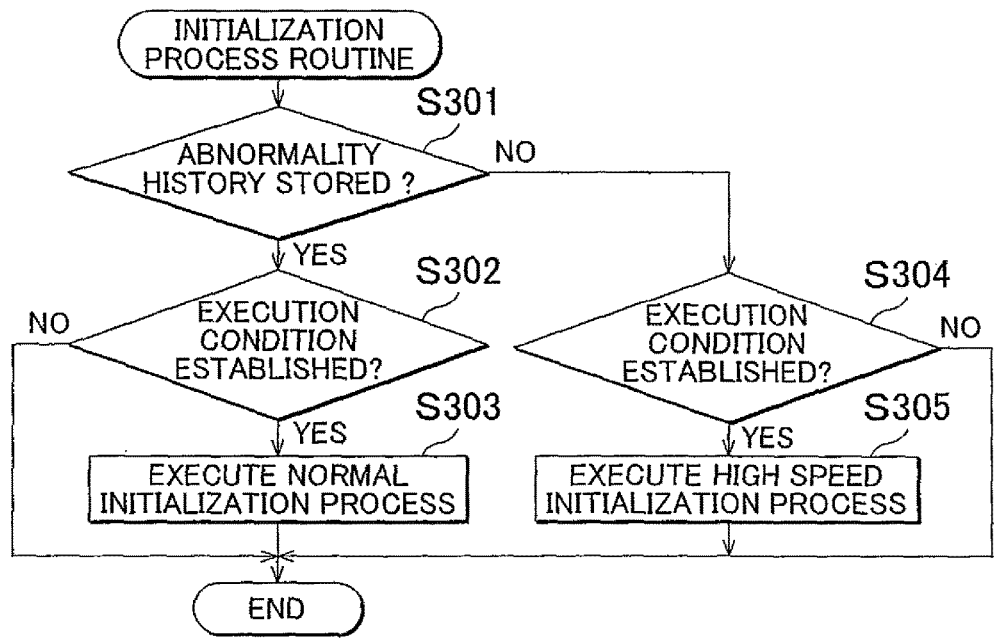
FIG. 7 is a flowchart showing procedures for executing an initialization process according to a second embodiment.

FIG. 7 is a flowchart showing an initialization process routine according to this embodiment. S301 to S304 of this initialization process routine are identical to S101 to S104 of the initialization process routine according to the first embodiment (FIG. 5). Hence, when the abnormality history is stored in the RAM 21a of the electronic control apparatus 21 (S301: YES), a normal initialization process (corresponding to the first initialization process of the first embodiment) is executed after determining that the execution condition is established in S302 (S303). When the abnormality history is not stored in the RAM 21a (S301: NO), on the other hand, a high speed initialization process is executed after determining that the execution condition is established in S304 (S305).

The high speed initialization process is an initialization process using full stroke driving, which is performed in accordance with [Procedure 1] to [Procedure 3] of the first embodiment. In the high speed initialization process, the driving speed of the actuator 15 when the actuator 15 is driven from the Lo end to the Hi end is increased beyond the driving speed of the actuator 15 during the aforesaid normal initialization process (the normal driving speed). When the actuator 15 is thus driven by a full stroke in a state where the driving speed of the actuator 15 is higher than usual, the period in which accompanying variation in the maximum lift amount and operation angle of the intake valve 9 affects the engine operation can be shortened. Hence, the variation in the maximum lift amount and operation angle of the intake valve 9 does not affect the engine operation greatly. Accordingly, the high speed initialization process can be executed not only during special engine operations when the above effect does not have to be taken into account, for example when the engine 1 is operated for the first time following recovery from an abnormality (an abnormality recovery operation) or the like, but also during a normal engine operation. As a result, the execution frequency of the initialization process can be increased.

Note that in the high speed initialization process, the actuator 15 is driven from the Lo end to the Hi end more quickly than in the normal initialization process, and therefore an error is more likely to occur in the current driving position of the actuator 15 detected by the position sensor 35 during driving of the actuator 15. However, in a situation where the abnormality history is not stored, this error does not take a large value. Hence, by correcting the offset of the driving position detected when the actuator 15 reaches the Hi end relative to the actual driving position during the initialization process, the detected driving position can be matched with the actual driving position even when an error occurs.

Figure 8:
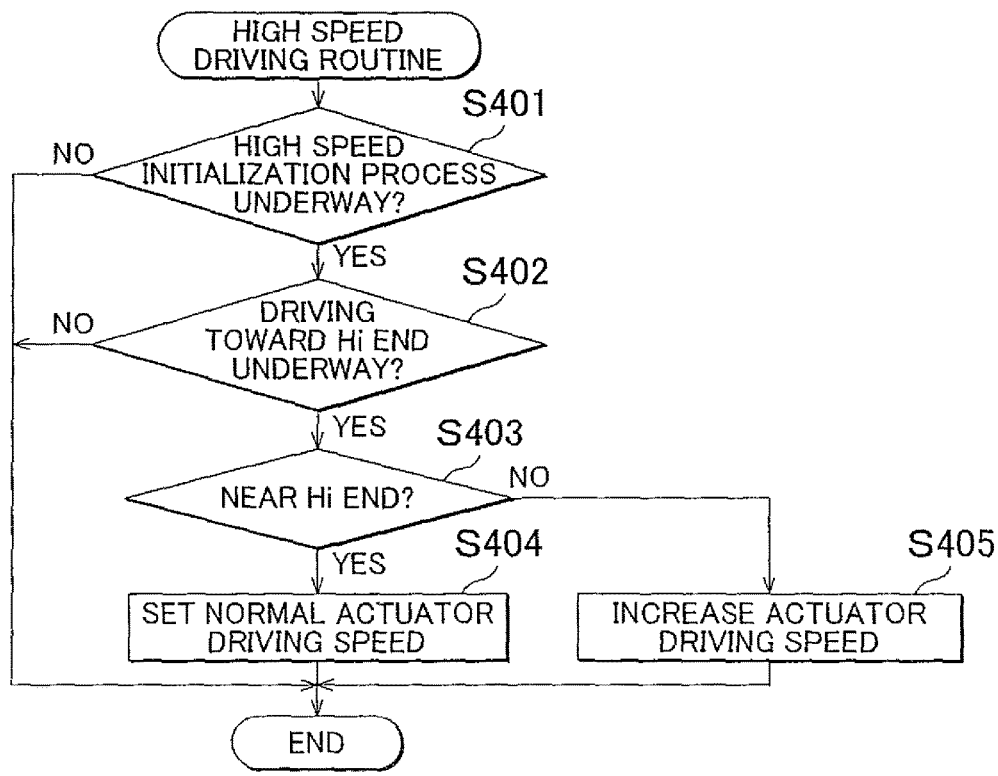
FIG. 8 is a flowchart showing procedures for controlling the driving speed of the actuator during a high speed initialization process.

FIG. 8 is a flowchart showing a high speed driving routine according to this embodiment. Processes performed in S402 to S405 of the high speed driving routine are identical to those performed in S202 to S205 of the high speed driving routine according to the first embodiment (FIG. 6). In the high speed driving routine according to this embodiment (FIG. 8), first, a determination is made as to whether or not the high speed initialization process is underway (S401). When an affirmative determination is made in S401, a determination is made as to whether or not the actuator 15 is currently being driven to the Hi end (S402). When an affirmative determination is made in S402, a determination is made as to whether or not the current driving position of the actuator 15 is near the Hi end (S403). When the actuator 15 is being driven to the Hi end but the current driving position of the actuator 15 is not near the Hi end (S403: NO), the driving speed of the actuator 15 is increased beyond the normal driving speed (the driving speed of the actuator 15 during the normal initialization process) (S405). When the actuator 15 is being driven to the Hi end and the current driving position of the actuator 15 is near the Hi end (S403: YES), the driving speed of the actuator 15 is set at a normal value (the aforesaid normal driving speed) (S404).

According to this embodiment, the following effects are obtained. (4) Either one of the two initialization processes for matching the driving position of the actuator 15 detected by the position sensor 35 with the actual driving position is executed in accordance with whether or not the abnormality history is stored in the RAM 21a of the electronic control apparatus 21. More specifically, when the abnormality history is stored, the normal initialization process in which the driving speed of the actuator 15 is set at the normal value is performed, and when the abnormality history is not stored, the high speed initialization process in which the driving speed of the actuator 15 is increased beyond the normal driving speed is performed. Thus, the execution frequency of the initialization process can be increased while ensuring that the driving position of the actuator 15 detected by the position sensor 35 can be matched with the actual driving position with a high degree of precision. Hence, situations in which the information relating to the driving position of the actuator 15 stored in the RAM 21a of the electronic control apparatus 21 remains at an offset value from the actual driving position due to a reduction in the execution frequency of the initialization process and therefore the actuator 15 is continuously drive-controlled using this inaccurate information can be suppressed. Accordingly, situations in which the actuator 15 is drive-controlled in a manner such that the maximum lift amount and operation angle of the intake valve 9 become inappropriate for the engine operation are suppressed, and as a result, deterioration of the combustion condition of the engine 1, leading to a reduction in the operability of the engine 1 and an increase in exhaust emissions, is prevented.

(5) In the high speed initialization process, the driving speed of the actuator 15 is reduced to the normal value when the actuator 15 is being driven toward the Hi end and the current driving position of the actuator 15 is near the Hi end. In so doing, a situation in which the actuator 15 is stopped suddenly after being driven to the Hi end with excessive momentum can be prevented from occurring in a case where the driving speed of the actuator 15 is increased when the current position of the actuator 15 is not near the Hi end, as described above.

Other Embodiments

Note that the embodiments described above may be modified as follows, for example. In the second initialization process of the first embodiment, the driving speed of the actuator 15 does not necessarily have to be increased beyond the normal driving speed.

When the actuator 15 is driven from one end of the driving range to the opposite end of the driving range that is opposite to the one end of the driving range in the first initialization process of the first embodiment and the respective initialization processes of the second embodiment, the actuator 15 may be driven from the Hi end to the Lo end of the driving range. In this case, the actuator 15 is driven toward the Lo end in [Procedure 2] of the second initialization process according to the first embodiment.

In the first and second embodiments, another parameter such as an amount of increase in the accelerator operation amount may be employed as the amount of increase in the required acceleration instead of the amount of increase in the throttle opening.

The invention claimed is:

1. A variable valve timing apparatus for an internal combustion engine, comprising:
   an actuator that activates a variable valve timing mechanism that varies a valve characteristic of an engine valve;
   a detection sensor configured to detect a driving position of the actuator;
   a control circuit configured to drive-control the actuator within a driving range thereof on the basis of the driving position detected by the detection sensor, and when a first predetermined execution condition or second predetermined execution condition is established, executes one of a first initialization process and a second initialization process that matches the driving position of the actuator detected by the detection sensor with an actual driving position of the actuator; and
   wherein the control circuit is further configured to determine whether or not an abnormality is present in the driving position detected by the detection sensor, and stores an abnormality history after determining that the abnormality is present,
   wherein the control circuit is configured to execute the first initialization process when the abnormality history is stored, in which the driving position detected by the detection sensor in a state where the actuator is driven to one end of the driving range is set at a first initial value, the actuator is then driven to an opposite end of the driving range, and the control circuit compensates for an offset amount from an appropriate value of the driving position detected by the detection sensor in a state where the actuator is driven to the opposite end of the driving range,
   wherein the control circuit is configured to execute the second initialization process when the abnormality history is not stored and when an amount of increase in acceleration required of the internal combustion engine equals or exceeds a positive predetermined value, the amount of increase in acceleration being based on a positive amount of increase in a throttle opening, such that a current and variable driving position detected by the detection sensor is set at a second initial value of the driving position, the actuator is then driven to the one end of the driving range, and the control circuit compensates for the offset amount from the appropriate value of the driving position detected by the detection sensor in a state where the actuator is driven to the one end of the driving range,
   wherein the control circuit is configured to increase a driving speed of the actuator to a first speed during the second initialization process that is higher than a driving speed during the first initialization process, when the actuator is driven towards the opposite end of the driving range, and
   wherein the control circuit is further configured to subsequently reduce the driving speed of the actuator to a second speed when the actuator is driven towards the opposite end of the driving range and the driving position of the actuator detected by the detection sensor is closer to the opposite end of the driving range than a predetermined position.

2. The variable valve timing apparatus for an internal combustion engine according to claim 1, wherein
   the variable valve timing mechanism includes a valve lift variation mechanism that is activated by the actuator and varies a maximum lift amount and an operation angle of an intake valve;
   the one end of the driving range is one of a Lo end where the maximum lift amount and the operation angle of the intake valve are smallest and a Hi end where the maximum lift amount and the operation angle of the intake valve are largest; and
   the opposite end of the driving range is the other one of the Lo end and the Hi end.

3. The variable valve timing apparatus for an internal combustion engine according to claim 1, wherein the control circuit determines that the abnormality is present in the driving position detected by the detection sensor on the basis of an instantaneous cut of a power supplied to the control circuit.

4. The variable valve timing apparatus for an internal combustion engine according to claim 1, wherein the actuator moves an element in a linear direction.

5. A control method for a variable valve timing apparatus for an internal combustion engine, comprising:
   detecting a driving position of an actuator that activates a variable valve timing mechanism that varies a valve characteristic of an engine valve;
   determining that an abnormality is present in the detected driving position;
   storing an abnormality history when determining that the abnormality is present; and
   executing, upon establishment of a first predetermined execution condition, a first initialization process that matches the detected driving position of the actuator with an actual driving position of the actuator, wherein
   the first initialization process comprises:
      setting the driving position detected in a state where the actuator is driven to one end of a driving range at a first initial value,
      driving the actuator to an opposite end of the driving range, and
      compensating for an offset amount from an appropriate value of the driving position detected in a state where the actuator is driven to the opposite end of the driving range,
   determining that an abnormality is not present in the detected driving position; and executing, upon establishment of a second predetermined execution condition, a second initialization process that matches the detected driving position of the actuator with an actual driving position of the actuator, wherein the second initialization process comprises:
setting a variable driving position currently detected at a second initial value,
driving the actuator to the one end of the driving range,
compensating for the offset amount from the appropriate value of the driving position detected in a state where the actuator is driven to the one end of the driving range,
increasing a driving speed of the actuator during the second initialization process to a first speed that is higher than a driving speed during the first initialization process when the actuator is driven towards the opposite end of the driving range, and
subsequently reducing the driving speed of the actuator during the second initialization process to a second speed when the actuator is driven towards the opposite end of the driving range and detecting that the driving position of the actuator is closer to the opposite end of the driving range than a predetermined position, wherein the first initialization process is executed when the abnormality history is stored, and the second initialization process is executed when the abnormality history is not stored and when an amount of increase in acceleration required of the internal combustion engine equals or exceeds a positive predetermined value, the amount of increase in acceleration being based on a positive amount of increase in a throttle opening.

6. The control method for a variable valve timing apparatus for an internal combustion engine according to claim 5, wherein the actuator moves an element in a linear direction.

7. A variable valve timing apparatus for an internal combustion engine, comprising:
an actuator that activates a variable valve timing mechanism that varies a valve characteristic of an engine valve;
a detection sensor configured to detect a driving position of the actuator;
a control circuit configured to drive-control the actuator within a driving range thereof on the basis of the driving position detected by the detection sensor, and when a first predetermined execution condition or second predetermined execution condition is established, executes one of a first initialization process and a second initialization process that matches the driving position of the actuator detected by the detection sensor with an actual driving position of the actuator; and wherein the control circuit is further configured to determine whether or not an abnormality is present in the driving position detected by the detection sensor, and stores an abnormality history after determining that the abnormality is present, wherein the control circuit is configured to execute the first initialization process when the abnormality history is stored, in which:
the driving position detected by the detection sensor in a state where the actuator is driven to one end of the driving range is set at a first initial value,
the actuator is then driven to an opposite end of the driving range,
the control circuit compensates for an offset amount from an appropriate value of the driving position detected by the detection sensor in a state where the actuator is driven to the opposite end of the driving range, and
a driving speed of the actuator is set at a normal value, the control circuit is configured to execute the second initialization process when the abnormality history is not stored and when an amount of increase in acceleration required of the internal combustion engine equals or exceeds a positive predetermined value, the amount of increase in acceleration beings based on a positive amount of increase in a throttle opening, in which
a current and variable driving position detected by the detection sensor is set at a second initial value of the driving position,
the actuator is then driven to the one end of the driving range, and
the control circuit compensates for the offset amount from the appropriate value of the driving position detected by the detection sensor in a state where the actuator is driven to the one end of the driving range,
the driving speed of the actuator is controlled to be at a high value higher than the normal value, when the actuator is driven towards the opposite end of the driving range, and
the driving speed of the actuator is subsequently controlled to be the normal value that is lower than the high value, when the driving position of the actuator detected by the detection sensor is closer to the opposite end of the driving range than a predetermined position.

8. The variable valve timing apparatus for an internal combustion engine according to claim 7, wherein the actuator moves an element in a linear direction.

* * * * *